US009527538B2

(12) United States Patent
Kaneko et al.

(10) Patent No.: US 9,527,538 B2
(45) Date of Patent: Dec. 27, 2016

(54) CONTROL DEVICE FOR LEGGED MOBILE ROBOT

(71) Applicant: HONDA MOTOR CO., LTD., Tokyo (JP)

(72) Inventors: Hiroyuki Kaneko, Saitama (JP); Chihiro Kurosu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 14/475,043

(22) Filed: Sep. 2, 2014

(65) Prior Publication Data

US 2015/0073592 A1 Mar. 12, 2015

(30) Foreign Application Priority Data

Sep. 6, 2013 (JP) ................................. 2013-185544

(51) Int. Cl.
*G06F 19/00* (2011.01)
*B62D 57/032* (2006.01)
*B62D 57/024* (2006.01)

(52) U.S. Cl.
CPC ........... *B62D 57/032* (2013.01); *B62D 57/024* (2013.01); *Y10S 901/01* (2013.01); *Y10S 901/28* (2013.01); *Y10S 901/29* (2013.01)

(58) Field of Classification Search
USPC ....... 700/245, 247, 249, 264, 252, 253, 258; 901/1, 2, 9, 28, 29; 318/568.1, 568.11, 318/568.16
See application file for complete search history.

(56) References Cited

U.S. PATENT DOCUMENTS

| | | | | |
|---|---|---|---|---|
| 7,053,577 B2* | 5/2006 | Nagasaka | ............ | B62D 57/032 180/8.6 |
| 7,308,335 B2* | 12/2007 | Takenaka | ............ | B62D 57/032 318/568.1 |
| 7,942,221 B1* | 5/2011 | Tilden | .................. | B62D 57/032 180/8.1 |
| 7,946,364 B2* | 5/2011 | Suga | .................... | B62D 57/032 180/8.1 |
| 8,060,253 B2* | 11/2011 | Goswami | ............. | B62D 57/032 318/568.23 |
| 8,386,076 B2* | 2/2013 | Honda | ................. | B62D 57/032 180/8.5 |
| 8,554,366 B2* | 10/2013 | Kajima | ................ | B62D 57/032 318/568.12 |
| 8,583,283 B2* | 11/2013 | Takenaka | ............. | B25J 19/0091 700/245 |

(Continued)

FOREIGN PATENT DOCUMENTS

JP 06-063876 A 3/1994
JP 2003-340763 A 12/2003

*Primary Examiner* — Ronnie Mancho
(74) *Attorney, Agent, or Firm* — Squire Patton Boggs (US) LLP

(57) ABSTRACT

A setting unit 33 configured to set a first landing permissible region in order to ground a free leg side foot 16 within an upper tread surface or a lower tread surface of a step existing ahead of a legged mobile robot 1 in a traveling direction, and a setting unit 34 configured to set a second landing permissible region in order to ground the free leg side foot 16 on an edge of the upper tread surface or the lower tread surface are provided to switch landing permissible regions for movement control of the robot 1 according to a step height.

6 Claims, 10 Drawing Sheets

(56) References Cited

U.S. PATENT DOCUMENTS

| | | | |
|---|---|---|---|
| 8,731,716 B2* | 5/2014 | Jacobsen | A61F 2/68 |
| | | | 700/245 |
| 8,805,582 B2* | 8/2014 | Zaier | B62D 57/032 |
| | | | 700/245 |
| 2004/0172165 A1* | 9/2004 | Iribe | B62D 57/032 |
| | | | 700/245 |
| 2015/0073592 A1* | 3/2015 | Kaneko | B62D 57/024 |
| | | | 700/245 |

* cited by examiner

CONTROL DEVICE FOR LEGGED MOBILE ROBOT

BACKGROUND OF THE INVENTION

Field of the Invention

The present invention relates to a control device for a legged mobile robot such as a bipedal walking robot.

Description of the Related Art

For example, when a bipedal walking robot is caused to go up and down stairs, a foot at the distal end of a free leg is usually landed on a stair tread surface to place the entire or substantially the entire foot on the stair tread surface (the upper tread surface on upward stairs or the lower tread surface on downward stairs) (for example, see Japanese Patent Application Publication No. H6-63876 and Japanese Patent Application Publication No. 2003-340763).

In this case, the landing position targeted for the foot of the free leg is usually determined to prevent the foot in the landing position from coming too close to both edges and the depth end of the tread surface.

SUMMARY OF THE INVENTION

In order to move a legged mobile robot such as a bipedal walking robot (which may be simply called a robot hereinafter) under various environments, it is preferred that the robot can go up and down steps such as stairs having various heights.

In this case, if a foot of a free leg of the robot is to be always landed on the upper tread surface or lower tread surface of a step in the ascending/descending motion of the robot in the step such as stairs, especially when the step height (the height between the lower tread surface and the upper tread surface) is relatively high, the displacement amount (bending angle) of a joint, such as an ankle joint or the like of the free leg or a supporting leg, which is required to land the foot tends to be large.

For example, when the robot is caused to go up upward stairs having a relatively high step height, the displacement amount of a joint, such as the ankle joint or the like of the free leg, becomes large at the time of the landing of the free leg on the upper tread surface.

Further, for example, when the robot is caused to go down downward stairs having a relatively high step height, the displacement amount of a joint, such as the ankle joint or the like of the supporting leg, becomes large at the time of the landing of the free leg on the lower tread surface.

In the meantime, each joint of a leg of the robot can be generally displaced only within a predetermined range of movement due to mechanical constraints.

Therefore, when the step height is high as mentioned above, if the displacement amount of the joint, such as the ankle joint or the like of the free leg or the supporting leg, which is required to land the foot of the free leg on the upper tread surface or the lower tread surface is large, the displacement amount will tend to exceed the range of movement. This eventually disables the robot from going up and down the step.

Suppose that the robot is moved over an upward step. In this case, when the foot of the free leg is landed on the upper tread surface, if the displacement amount of the joint such as the ankle joint or the like of the free leg becomes large because the step is high as mentioned above, moment applied to the ankle joint or the like the displacement amount of which is large also tends to be large upon shifting the weight of the robot to the foot side immediately after the foot of the free leg is landed.

Further, suppose that the robot is moved over a downward step. In this case, when the foot of the free leg is landed on the lower tread surface, if the displacement amount of the joint such as the ankle joint or the like of the supporting leg becomes large because the step is high as mentioned above, moment applied to the ankle joint or the like of the supporting leg the displacement amount of which is large also tends to be large immediately before the landing of the foot of the free leg.

Then, when the moment thus applied to a joint is large, since a required driving force of an actuator for driving the joint becomes large, there is a disadvantage of increasing the size or the weight of the actuator.

The present invention has been made in view of the above background, and it is an object thereof to provide a control device capable of moving a robot over steps having various heights while preventing excessive displacement of a joint of a leg of the legged mobile robot.

In order to achieve the above object, the control device for a legged mobile robot of the present invention is a control device for a legged mobile robot, which causes the legged mobile robot to move on a floor having a step, comprising:

a first landing permissible region setting unit configured to set a first landing permissible region indicating a region of a landing position of a foot of a free leg, which is permitted to ground the foot of the free leg of the legged mobile robot within an upper tread surface or a lower tread surface of the step in a situation where the step exists ahead of the legged mobile robot in a traveling direction;

a second landing permissible region setting unit configured to set a second landing permissible region indicating a region of the landing position of the foot of the free leg of the legged mobile robot, which is permitted to ground the foot of the free leg of the legged mobile robot on an edge of a tread surface in a posture inclined relative to the upper tread surface or the lower tread surface of the step in the situation;

a landing permissible region selecting unit configured to select either one landing permissible region as a landing permissible region for movement control of the legged mobile robot among the first landing permissible region and the second landing permissible region in the situation while switching the selected landing permissible region to the other according to a height of the step; and a leg motion control unit configured to control a motion of each leg of the legged mobile robot in the step based on such a constraint condition that the landing position of the foot of the free leg is made present in the landing permissible region selected by the landing permissible region selecting unit (first invention).

When the step is an upward step, the edge in the present invention means a boundary on the front side of the upper tread surface as viewed from the legged mobile robot. When the step is a downward step, the edge means a boundary on the depth side of the lower tread surface as viewed from the legged mobile robot.

Here, according to various studies of the inventors of the present application, if the step height is relatively high when the legged mobile robot is moved over a step such as stairs, the foot of the free leg of the legged mobile robot will be landed to be able to ground on an edge of the upper tread surface or the lower tread surface in a posture of the foot being inclined relative to the upper tread surface or the lower tread surface upon landing in a portion of either the upper tread surface (when the step is an upward step) or the lower tread surface (when the step is a downward step), so that the displacement amount (bend angle) of an ankle joint and the like of one leg can be reduced at the time of landing the foot of the free leg or the next time the foot leaves the floor after the landing of the free leg.

On the other hand, when the step height is relatively low, if the free leg side foot is grounded on an edge of the upper tread surface or the lower tread surface in a posture inclined relative to the upper tread surface or the lower tread surface, interference between the foot and the floor surface tends to occur.

Therefore, in the first invention, the landing permissible region selecting unit selects, as a landing permissible region for movement control of the legged mobile robot, either one of the first landing permissible region and the second landing permissible region according to the step height in a situation where the step exists ahead of the legged mobile robot in the traveling direction.

For example, when the step height exceeds a predetermined threshold value, the second landing permissible region is selected as the landing permissible region for movement control, while when the step height is lower than the predetermined threshold value, the first landing permissible region is selected as the landing permissible region for movement control.

Then, the leg motion control unit controls the motion of each leg of the legged mobile robot in the step based on such a constraint condition that the landing position of the foot of the free leg is made present in the landing permissible region selected by the landing permissible region selecting unit.

Thus, according to the first invention, the second landing permissible region is selected as the landing permissible region for movement control when the step height is relatively high, so that the foot can be grounded on an edge of an upper tread surface or a lower tread surface in a posture of the foot being inclined relative to the tread surface when the foot of the free leg is landed or made to leave the floor after the landing.

As a result, the robot can be moved over steps having various heights while preventing the displacement amount of each joint such as an ankle joint of each leg of the legged mobile robot from becoming excessive.

In the first invention, it is preferred that, when the second landing permissible region is selected by the landing permissible region selecting unit in a situation where the step existing ahead of the legged mobile robot in the traveling direction is an upward step, the leg motion control unit should land the foot of the free leg on an edge of an upper tread surface in a posture inclined relative to the upper tread surface of the step while satisfying the constraint condition, and then, control the motion of each leg in such a manner that, after the foot is rotated in a pitch direction to ground on the upper tread surface, the foot is made to perform a next floor leaving from the edge (second invention).

According to the second invention, when the second landing permissible region is selected as the landing permissible region for movement control in the situation where the step is an upward step, the displacement amount of each joint of the free leg at the time of landing the foot of the free leg can be effectively suppressed even if the height of the upward step is relatively high. This can effectively prevent the displacement amount of each joint of each leg of the legged mobile robot from becoming excessive during movement in the upward step.

In the first invention or the second invention, it is preferred that, when the second landing permissible region is selected by the landing permissible region selecting unit in a situation where the step existing ahead of the legged mobile robot in the traveling direction is a downward step, the leg motion control unit should land the foot of the free leg on a lower tread surface while satisfying the constraint condition, and then, control the motion of each leg in such a manner that, after the foot is rotated in the pitch direction to ground on an edge of the lower tread surface in a posture of the foot being inclined relative to the lower tread surface, the foot is made to perform a next floor leaving from the edge (third invention).

According to the third invention, when the second landing permissible region is selected as the landing permissible region for movement control in the situation where the step is the downward step, the displacement amount of each joint of the other leg can be effectively suppressed when the foot of the free leg leaves the floor after the landing even if the height of the downward step is relatively high. This can effectively prevent the displacement amount of each joint of each leg of the legged mobile robot from becoming excessive during movement in the downward step.

In the above first to third inventions, it is preferred to further include a third landing permissible region setting unit configured to set a third landing permissible region defined depending on a structure of the legged mobile robot as a region in which the foot of the free leg can be landed without an occurrence of interference between the free leg and another leg while limiting the motion of each leg of the legged mobile robot within a range of movement of each leg in the situation, wherein the leg motion control unit is configured to control the motion of each leg of the legged mobile robot in the step based on a further constraint condition that the landing position of the foot of the free leg is made present in the third landing permissible region (fourth invention).

According to the fourth invention, the third landing permissible region is set by the third landing permissible region setting unit separately from the first landing permissible region and the second landing permissible region so that the first landing permissible region and second landing permissible region can be set without any consideration for interference between the free leg and the other leg. Thus, the processing for setting the first and second landing permissible regions can easily be performed.

In this fourth invention, it is preferred that the first landing permissible region setting unit should be configured to set the first landing permissible region to be dependent on a shape and size of the upper tread surface or the lower tread surface on which the foot of the free leg is to be grounded, and the second landing permissible region setting unit should be configured to set the second landing permissible region to be dependent on a shape and size of an edge of the upper tread surface or the lower tread surface on which the foot of the free leg is to be grounded, and to be able to limit the displacement amount of each joint within a predetermined range when the foot is grounded on the edge (fifth invention).

According to this fifth invention, the landing position of the foot of the free leg, which is preferred to move the legged mobile robot without causing a situation where interference between legs or between a leg and a step occurs when the legged mobile robot is moved over the step, or where the displacement amount of each joint of either leg becomes excessive, or where a grounded portion of each leg on the step leans to an end of the step, can be limited properly by the first landing permissible region or the second landing permissible region, and the third landing permissible region.

DESCRIPTION OF THE PREFERRED EMBODIMENT

One embodiment of the present invention will be described below with reference to FIG. 1 to FIG. 10.

Figure 1:
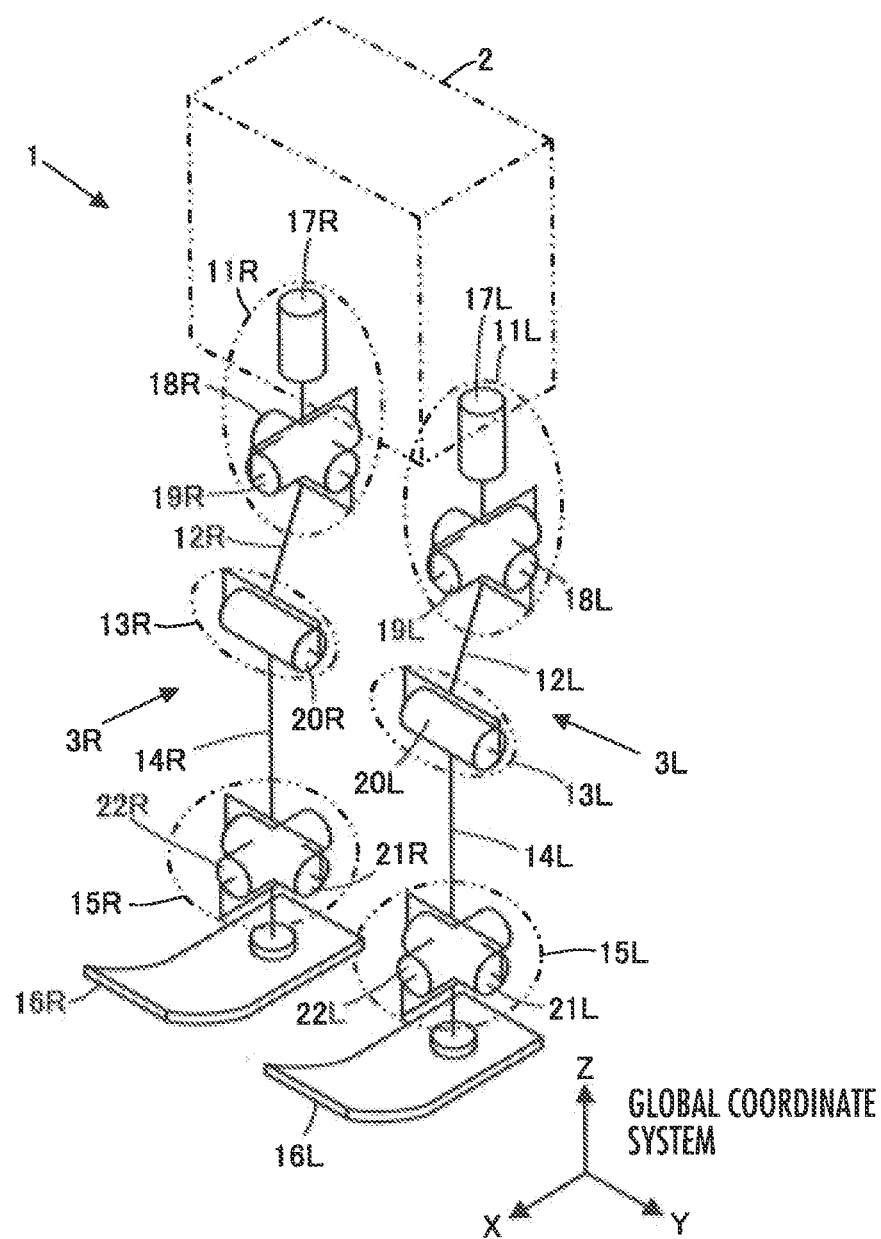
FIG. 1 is a view showing a schematic structure of a legged mobile robot of one embodiment of the present invention.

Referring to FIG. 1, a legged mobile robot 1 (hereinafter simply called a robot 1) of the embodiment is a bipedal walking robot having a body 2 corresponding to the upper body of the robot 1, a pair of (two) right and left legs 3R and 3L extended from the body 2.

In the description of the embodiment, the symbol "R" is added to a variable indicative of the right member toward the front side of the robot 1, and the symbol "L" is added to a variable indicative of the left member toward the front side of the robot 1. Note that the symbols "R" and "L" may be omitted when it is not necessary to distinguish between the right side and the left side clearly.

The legs 3R and 3L have the same structure as each other. Specifically, each leg 3 includes, as multiple element links that make up the leg 3, a thigh 12 connected to the body 2 through a hip joint 11, a shank 14 connected to this thigh 12 through a knee joint 13, and a foot 16 connected to this shank 14 through an ankle joint 15. In this case, the distal end of each leg 3 is configured by the foot 16.

Then, the hip joint 11 of each leg 3 is configured of three joints 17, 18, and 19 having rotational degrees of freedom in a yaw direction (the direction about the Z axis), a pitch direction (the direction about the Y axis), and a roll direction (the direction about the X axis), respectively. The knee joint 13 is configured of a joint 20 having a rotational degree of freedom in the pitch direction. The ankle joint 15 is configured of two joints 21 and 22 having rotational degrees of freedom in the pitch direction and the roll direction, respectively.

Thus, in the embodiment, the foot 16 at the distal end of each leg 3 has six degrees of freedom of motion relative to the body 2.

Note that the rotational axis (X axis) in the roll direction, the rotational axis (Y axis) in the pitch direction, and the rotational axis (Z axis) in the yaw direction mean the axis in the front-back direction, the axis in the horizontal direction, and the axis in the vertical direction of the robot 1, respectively. Further, the rotational axes of the joints 17 to 22 of each leg 3 in the above description denote rotational axes in a state of extending the leg 3 in the vertical direction.

The above is the basic structure of the robot 1 of the embodiment. The robot 1 having such a structure performs spatial motion of each leg 3 by driving the six joints 17 to 22 of each leg 3. This motion allows the robot 1 to move on a floor.

As a supplement, the robot 1 may include, for example, arm links extended from the lateral sides of the body 2, a head mounted on the top of the body 2, and the like, in addition to the body 2, and legs 3R, 3L mentioned above.

Further, for example, the body 2 may be configured of a lower body (waist) to which the legs 3R, 3L are connected, and an upper body (breast) connected to the upper side of the lower body through joints.

Figure 2:
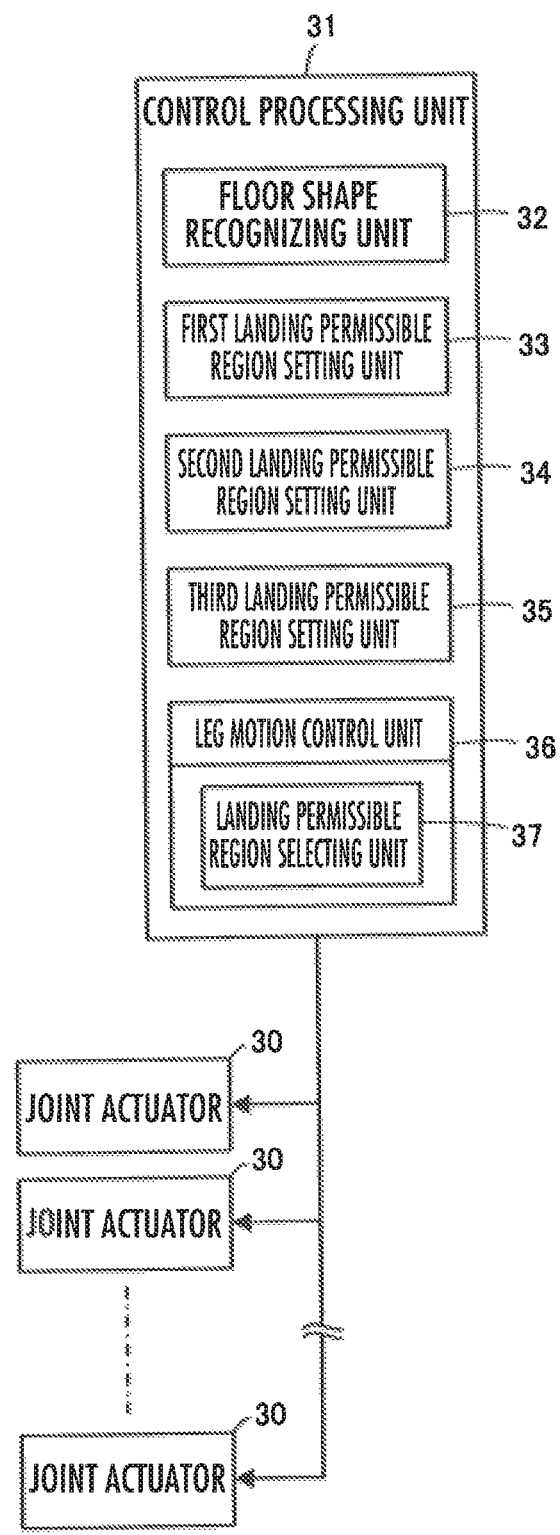
FIG. 2 is a block diagram showing a configuration related to a control of the legged mobile robot of the embodiment.

Though not shown in FIG. 1, joint actuators 30 for driving the respective joints 17 to 22 to rotate, and a control processing unit 31 for controlling the operation of the robot 1 are mounted in the robot 1 as shown in FIG. 2.

Each joint actuator 30 is, for example, an electric motor or a hydraulic actuator provided for each joint. In this case, a drive mechanism of each joint actuator 30 for each joint may be of any known structure. Further, the joint actuator 30 may be a direct acting actuator as well as a rotary actuator.

The control processing unit 31 is an electronic circuit unit including a CPU, a RAM, a ROM, an interface circuit, and the like. This control processing unit 31 includes, as functions implemented by a program installed or functions implemented by a hardware configuration: a floor shape recognizing unit 32 configured to recognize a floor shape in an environment where the robot 1 is moved; a first landing permissible region setting unit 33, a second landing permissible region setting unit 34, and a third landing permissible region setting unit 35, which are configured to perform processing for setting a first landing permissible region, a second landing permissible region, and a third landing permissible region of the foot 16 of the free leg 3 (3R or 3L) of the robot 1, respectively; and a leg motion control unit 36 configured to control the motion of each leg 3. The leg motion control unit 36 includes a function as a landing permissible region selecting unit 37 configured to select a landing permissible region for movement control of the robot 1.

In the following description, the free leg 3 is denoted by a reference numeral 3$swg$, and a supporting leg 3 is denoted by a reference numeral 3$sup$. Further, the foot 16 of the free leg 3$swg$ is denoted by a reference numeral 16$swg$, and the foot 16 of the supporting leg 3$sup$ is denoted by a reference numeral 16$sup$.

The free leg 3$swg$ is a leg 3 which carries out a sequence of actions on the foot 16$swg$, i.e., leaving the floor, moving in the air, and landing on the floor, during movement of the robot 1, and the supporting leg 3$sup$ is a leg 3 which keeps the foot 16sup grounded on the floor surface to support the weight of the robot 1 when the foot 16swg of the free leg 3swg is moved in the air.

In the embodiment, since the robot 1 is a bipedal walking robot, the leg 3R (or 3L) as the free leg 3swg and the leg 3L (or 3R) as the supporting leg 3sup are alternately switched during movement in walking motion of the robot 1 (including movement in a step such as stairs).

Then, when the robot 1 goes up an upward step such as upward stairs Su, the motion of the free leg 3swg is carried out to land on a tread surface one step above the tread surface on which the supporting leg side foot 16sup is kept grounded after the free leg side foot 16swg is off the floor.

Further, when the robot 1 goes down a downward step such as downward stairs Sd, the motion of the free leg 3swg is carried out to land on a tread surface one step below the tread surface on which the supporting leg side foot 16sup is kept grounded after the free leg side foot 16swg is off the floor.

Figure 3:
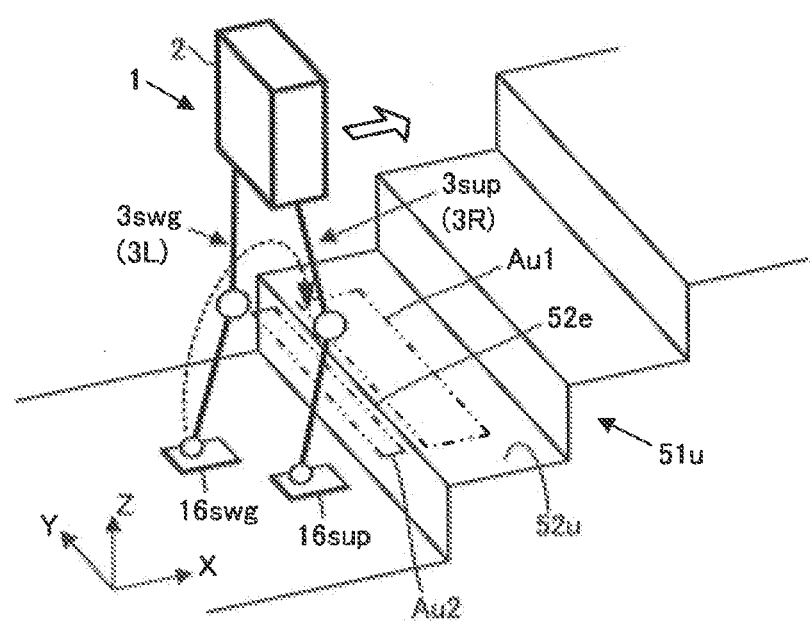
FIG. 3 is a perspective view illustrating an upward step over which the legged mobile robot of the embodiment is moved.
Figure 4:
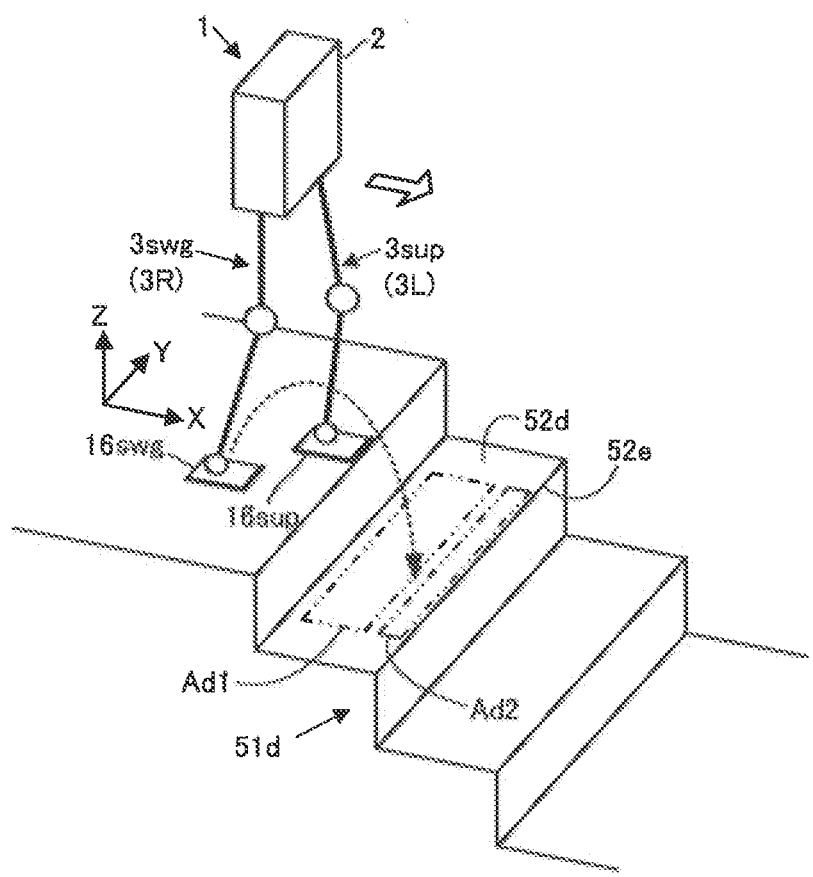
FIG. 4 is a perspective view illustrating the upward step over which the legged mobile robot of the embodiment is moved.

The floor shape recognizing unit 32 recognizes a floor shape ahead of the robot 1 in the traveling direction based, for example, on images taken by a camera (not shown) mounted in the robot 1. Floors whose shapes are recognized by the floor shape recognizing unit 32 include a floor with a step or irregularity as well as a flat floor. For example, when upward steps 51u (upward stairs in the example shown) exist ahead of the robot 1 in the traveling direction as shown in FIG. 3, or when downward steps 51d (downward stairs in the example shown) exist as shown in FIG. 4, the shape and layout position of these steps 51u, 51d (layout position relative to the robot 1) are recognized by the floor shape recognizing unit 32.

Note that the floor shape ahead of the robot 1 in the traveling direction may be recognized using, for example, a laser ranging device instead of the camera, or using a combination of the camera and the laser ranging device.

Further, when the floor shape in a moving environment of the robot 1 is known in advance, the floor shape ahead of the robot 1 in the traveling direction may be recognized from the position of the robot 1 and map information (information indicative of a floor shape of each position) on the moving environment of the robot 1.

In this case, for example, the map information can be input into the control processing unit 31 from an external server as needed. Alternatively, a storage medium (such as a memory, a DVD, or a hard disk) with the map information prestored thereon may be mounted in the robot 1.

The first landing permissible region setting unit 33 corresponds to a first landing permissible region setting unit in the present invention. This first landing permissible region setting unit 33 is a functional unit which, when the floor shape recognizing unit 32 recognizes that a step such as stairs exists ahead of the robot 1 in the traveling direction, performs processing for setting a first landing permissible region of the free leg side foot 16swg, which indicates a landing position region permitted to ground the free leg side foot 16swg within the upper tread surface of the upward step or the lower tread surface of the downward step.

More specifically, the above first landing permissible region is a permissible region for the landing position of the free leg side foot 16swg, which is set to be able to ground the entire (or substantially the entire) bottom surface (grounding surface) of the free leg side foot 16swg on the upper tread surface or the lower tread surface.

Here, the position of each foot 16 means the position of a representative point P (a point fixed with respect to the foot 16) arbitrarily set for the foot 16. In the embodiment, for example, a point P preset in a portion near a heel on the bottom surface (grounding surface) of the foot 16 is used as the representative point P of the foot 16 (see FIG. 5 and the like). Note that the representative point P of the foot 16 may be set to any other point, such as a point near a tiptoe of the foot 16.

Then, the landing position of the foot 16 is a position of the foot 16 defined by the landing of the foot 16. More specifically, the landing position is a position of the foot 16 (a position of the representative point P) at the beginning of the landing of the foot 16 or during a grounded period after the landing.

In the embodiment, a position of the foot 16 in a state where the foot 16 is grounded on the floor surface in a posture of the bottom surface of the foot 16 being parallel to the floor surface in the landing portion (or a posture of that being level with the floor surface) at the beginning of the landing of the foot 16 or after the landing is used as the landing position of the foot 16 for convenience sake. Note that a position of the foot 16 in a state where the foot 16 is grounded on the floor surface in a posture of the bottom surface of the foot 16 being inclined relative to the floor surface can also be used as the landing position of the foot 16.

In the embodiment, the first landing permissible region setting unit 33 sets a first landing permissible region to be dependent on the shape and size (width, depth, area, and the like) of the upper tread surface of the upward step or the lower tread surface of the downward step.

In this case, when the step ahead of the robot 1 in the traveling direction is the upward step, the first landing permissible region is set to a region in which the foot 16 of the free leg 3swg is prevented from coming too close to a boundary at both sides of an upper tread surface (a tread surface one step above the tread surface on which the supporting leg side foot 16sup is grounded) and a boundary on the depth side thereof.

Figure 5A:
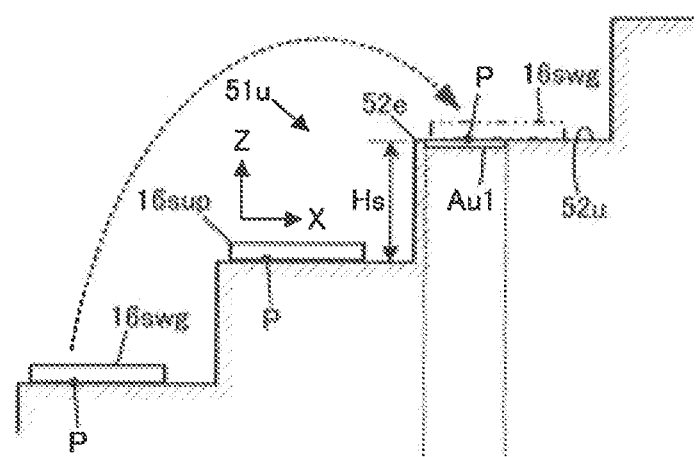
FIG. 5A is a side view illustrating a setting example of a first landing permissible region in an upward step.
Figure 5B:
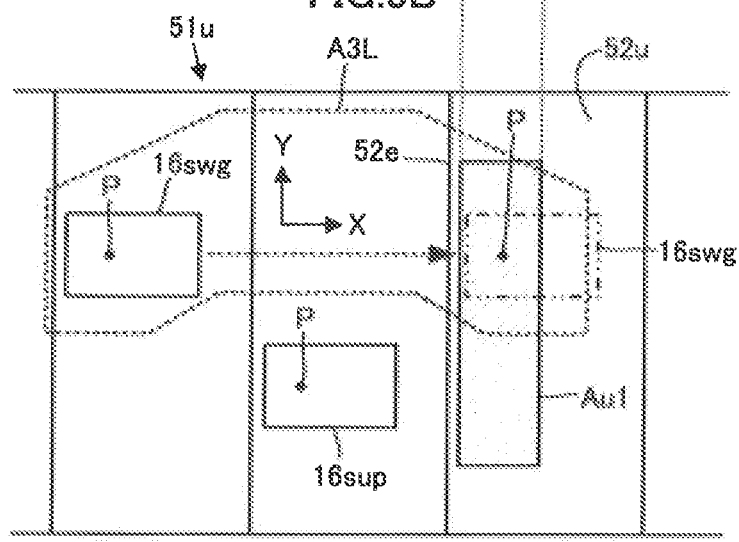
FIG. 5B is a plan view illustrating a setting example of a first landing permissible region in an upward step.

For example, when the step ahead of the robot 1 in the traveling direction is the upward step 51u (upward stairs) as shown in FIG. 3, or FIG. 5A or 5B, the first landing permissible region is set to a region as indicated by a reference numeral Au1 within an upper tread surface 52u. The first landing permissible region Au1 is a region having predetermined clearances, for example, respectively from a boundary of both sides of the upper tread surface 52u, from a boundary on the depth side, and from a boundary on the front side.

Figure 6A:
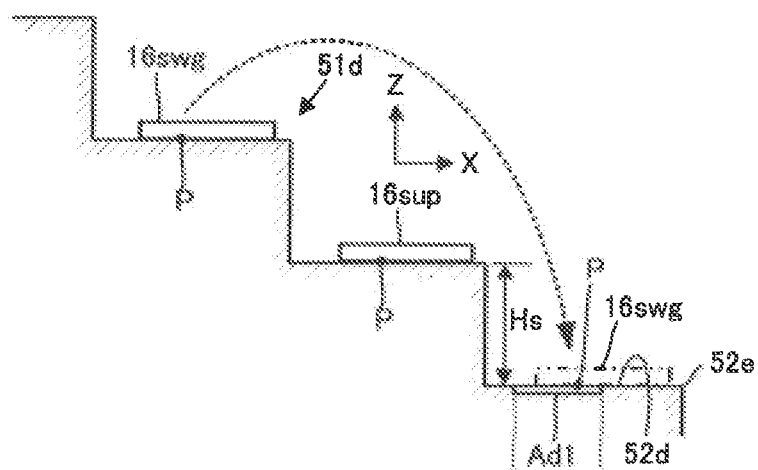
FIG. 6A is a side view illustrating a setting example of a first landing permissible region in a downward step.
Figure 6B:
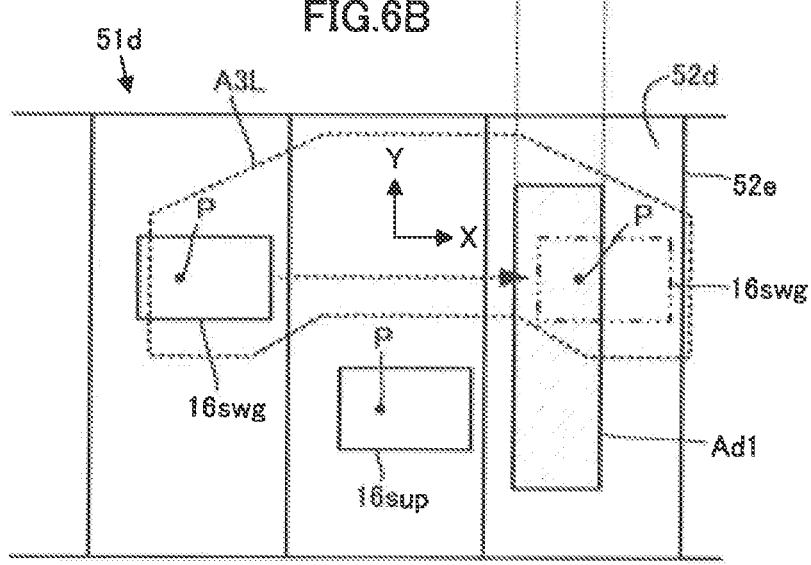
FIG. 6B is a plan view illustrating a setting example of a first landing permissible region in a downward step.

Further, when the step ahead of the robot 1 in the traveling direction is the downward step 51d (downward stairs) as shown in FIG. 4, or FIG. 6A or 6B, the first landing permissible region is set to a region as indicated by a reference numeral Ad1 within a lower tread surface 52d. The first landing permissible region Ad1 is a region having predetermined clearances, for example, respectively from a boundary of both sides of the lower tread surface 52d, from a boundary on the front side, and from a boundary on the depth side.

Note that the boundary on the front side of the upper tread surface 52u in the upward step 51u (the front side as viewed from the robot 1) or the boundary on the depth side of the lower tread surface 52d in the downward step 51d (the depth side as viewed from the robot 1) corresponds to an edge in the present invention. The boundary (edge) will be indicated by a reference numeral 52e below.

The second landing permissible region setting unit 34 corresponds to a second landing permissible region setting unit in the present invention. This second landing permissible region setting unit 34 is a functional unit which, when the floor shape recognizing unit 32 recognizes that a step such as stairs exists ahead of the robot 1 in the traveling direction, performs processing for setting a second landing permissible region of the free leg side foot 16swg, which indicates a landing position region permitted to ground the free leg side foot 16swg on the edge of the tread surface in a posture of the free leg side foot 16swg being inclined relative to the upper tread surface of the upward step or the lower tread surface of the downward step.

Here, the grounding of the free leg side foot 16swg on the edge of the tread surface in the posture of the free leg side foot 16swg being inclined relative to the upper tread surface or the lower tread surface (a posture inclined in the pitch direction) means grounding of the free leg side foot 16swg on the edge in a line contact state (or substantially a line contact state). The inclination of the free leg side foot 16swg in this line contact state (inclination in the pitch direction) is an inclination within a preset, predetermined range.

Then, when the free leg side foot 16swg is grounded on the edge of the upper tread surface in the upward step as mentioned above, a portion of the free leg side foot 16swg near the heel protrudes from the upper tread surface on the front side as viewed from the normal direction (vertical direction) of the upper tread surface.

Further, when the free leg side foot 16swg is grounded on the edge of the lower tread surface in the downward step as mentioned above, a portion of the free leg side foot 16swg near the tiptoe protrudes from the lower tread surface on the depth side as viewed from the normal direction (vertical direction) of the lower tread surface.

Therefore, when the upward step exists ahead of the robot 1 in the traveling direction, the second landing permissible region setting unit 34 sets a second landing permissible region so that a portion of the free leg side foot 16swg near the heel in the landing position of the free leg side foot 16swg within the second landing permissible region will protrude from the upper tread surface on the front side.

When the downward step exists ahead of the robot 1 in the traveling direction, the second landing permissible region setting unit 34 sets a second landing permissible region so that a portion of the free leg side foot 16swg near the tiptoe in the landing position of the free leg side foot 16swg within the second landing permissible region will protrude from the lower tread surface on the depth side.

Further, the second landing permissible region setting unit 34 sets the second landing permissible region to be dependent on the shape and size of the edge of the upper tread surface in the upward step or the lower tread surface in the downward step and to be able to limit the displacement amount of each of the joints 17 to 22 of the legs 3R and 3L when the free leg side foot 16swg is landed on the edge within a predetermined range for each joint.

In this case, when the upward step exists ahead of the robot 1 in the traveling direction, the second landing permissible region is so set that the free leg side foot 16swg will be prevented from coming too close to both ends of the edge of the upper tread surface and the displacement amount of each of the joints 17 to 22 of the legs 3R and 3L can be limited within a predetermined range for each joint when the free leg side foot 16swg is landed on the edge of the upper tread surface at the beginning of the landing.

Note that the predetermined range for each joint is a default range preset for each joint as a range not to come too close to the boundary (limit) of a range of movement of each of the joints 17 to 22 defined depending on the structure of each of the joints 17 to 22 or the structure of the joint actuator 30.

When the downward step exists ahead of the robot 1 in the traveling direction, the second landing permissible region is so set that the free leg side foot 16swg will be prevented from coming too close to both ends of the edge of the lower tread surface and the displacement amount of each of the joints 17 to 22 of the legs 3R and 3L can be limited within the predetermined range for each joint when the free leg side foot 16swg is landed on the edge of the lower tread surface immediately before leaving the floor after the landing (more specifically, after the free leg side foot 16swg is turned into the supporting leg side foot 16sup) in the motion of the robot 1 going down the downward step.

Figure 7A:
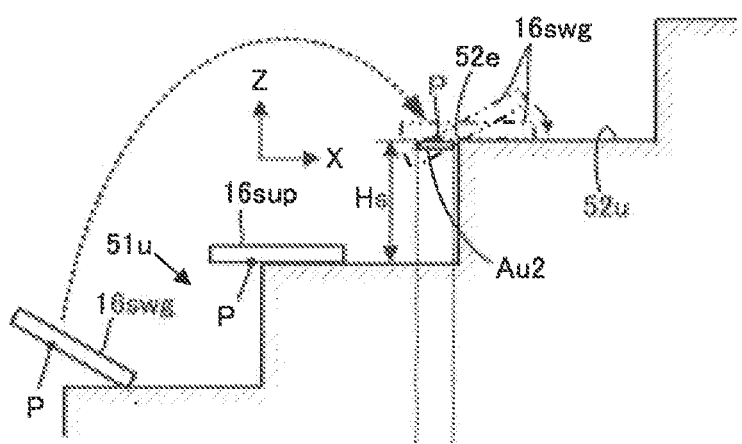
FIG. 7A is a side view illustrating a setting example of a second landing permissible region in an upward step.
Figure 7B:
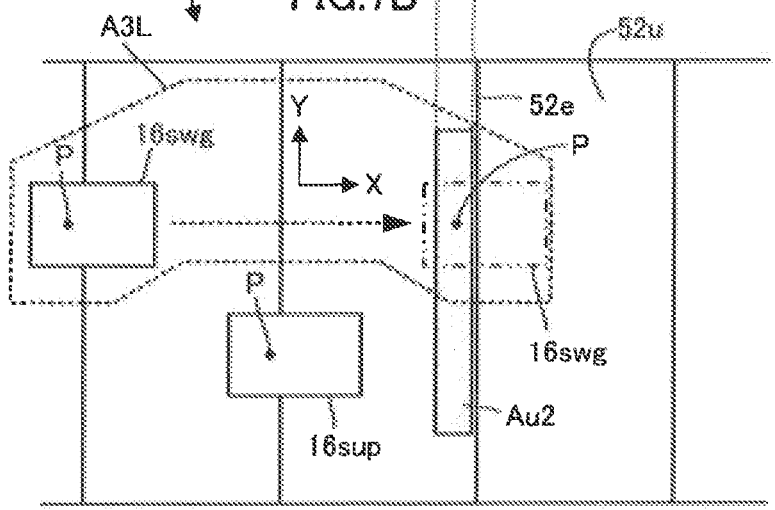
FIG. 7B is a plan view illustrating a setting example of a second landing permissible region in an upward step.

For example, when the step ahead of the robot 1 in the traveling direction is the upward step 51u (upward stairs) as shown in FIG. 3, or FIG. 7A or 7B, the second landing permissible region is set to a region as indicated by a reference numeral Au2 within the width of the upper tread surface 52u (within the width of the upper tread surface 52u in the Y-axis direction). For example, the second landing permissible region Au2 is set on a plane at the same height as the upper tread surface 52u so that clearances from both ends of the edge 52e of the upper tread surface 52u (clearances in the extending direction (Y-axis direction) of the edge 52e) will be preset values, respectively, and the width in the X-axis direction and a clearance from the edge 52e will be preset values, respectively.

Figure 8A:
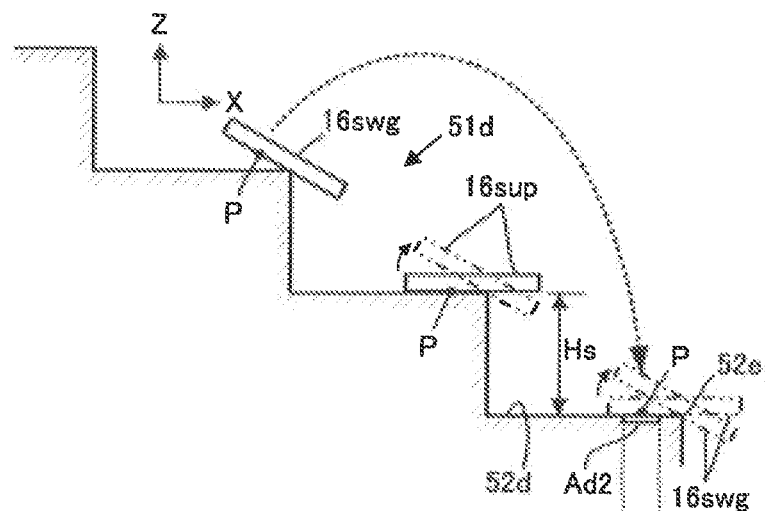
FIG. 8A is a side view illustrating a setting example of a second landing permissible region in a downward step.
Figure 8B:
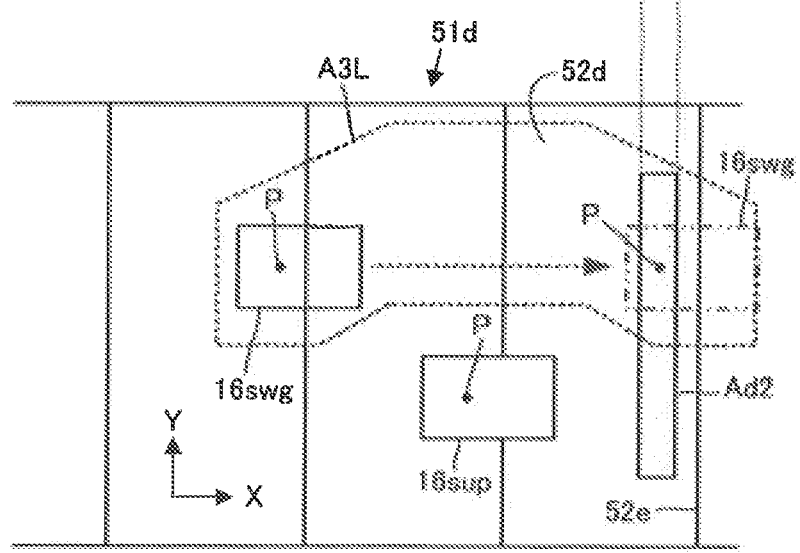
FIG. 8B is a plan view illustrating a setting example of a second landing permissible region in a downward step.

Further, when the step ahead of the robot 1 in the traveling direction is the downward step 51d (downward stairs) as shown in FIG. 4, or FIG. 8A or 8B, the second landing permissible region is set to a region as indicated by a reference numeral Ad2 within the width of the lower tread surface 52d (within the width of the lower tread surface 52d in the Y-axis direction). For example, the second landing permissible region Ad2 is set on a plane at the same height as the lower tread surface 52d so that clearances from both ends of the edge 52e of the lower tread surface 52d (clearances in the extending direction (Y-axis direction) of the edge 52e) will be preset values, respectively, and the width in the X-axis direction and a clearance from the edge 52e will be preset values, respectively.

As a supplement, the representative point P of each foot 16 is set in a position near the heel in the embodiment. Therefore, the second landing permissible region Au2 related to the upward step 51u is a region in front of the upper tread surface 52u as shown in FIG. 3, or FIG. 7A or 7B. Further, the second landing permissible region Ad2 related to the downward step 51d is a region within the lower tread surface 52d as shown in FIG. 4, or FIG. 8A or 8B.

Further, in the embodiment, the landing position of the free leg side foot 16swg is the position of the foot 16swg in such a state that the foot 16swg is landed on the floor surface in a posture of the bottom surface of the foot 16swg being parallel to the floor surface in the landing portion as mentioned above. Therefore, the second landing permissible regions Au2 and Ad2 are set on the planes at the same height as the upper tread surface 52u and the lower tread surface 52d, respectively.

The third landing permissible region setting unit 35 corresponds to a third landing permissible region setting unit in the present invention. This third landing permissible region setting unit 35 is a functional unit which performs processing for setting a third landing permissible region indicating a permissible region of the landing position of the free leg side foot 16swg defined depending on the structure of the robot 1 (particularly the structure of each leg 3) in any of the cases where the step exists or does not exist ahead of the robot 1 in the traveling direction.

This third landing permissible region is set to a region in which the free leg side foot 16*swg* can be landed without the occurrence of interference between the free leg 3*swg* and the other leg (the supporting leg 3*sup*) while limiting the motion of each leg 3 within a range of movement of each leg 3. Further, the third landing permissible region is so set that the size or the shape of the third landing permissible region will change depending on the height of the landing position of the free leg side foot 16*swg*.

In the embodiment, a relationship between each of various heights of landing positions of the free leg side foot 16*swg* and the size, shape, and position (position relative to the grounding position of the supporting leg side foot 16*sup*) of the third landing permissible region to be set is predefined in the form of a map or an arithmetic expression for each of the cases when the supporting leg 3*sup* is the right leg 3R (i.e., when the free leg 3*swg* is the left leg 3L) and when the supporting leg 3*sup* is the left leg 3L (i.e., when the free leg 3*swg* is the right leg 3R).

Then, the third landing permissible region setting unit 35 sets a third landing permissible region based on the above map or the arithmetic expression from information indicating whether the free leg 3*swg* is either of the right leg 3R and the left leg 3L, and the height of the landing position of the free leg side foot 16*swg* (the height of the upper tread surface in the upward step or the height of the lower tread surface in the downward step) recognized by the floor shape recognizing unit 32.

Figure 9A:
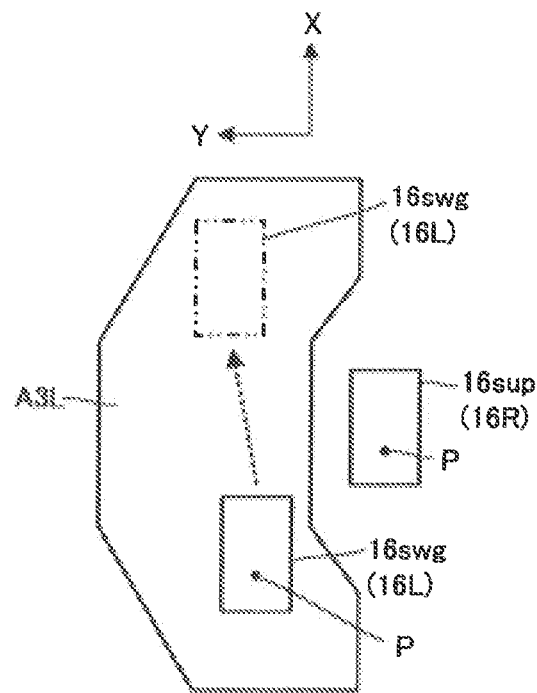
FIG. 9A is a view illustrating a setting example of a third landing permissible region when a supporting leg is a right leg.

When the supporting leg 3*sup* is the right leg 3R (i.e., when the free leg 3*swg* is the left leg 3L), the third landing permissible region thus set is set to a region A3L existing on the left side of the supporting leg side foot 16*sup*, for example, as shown in FIG. 9A. Further, when the supporting leg 3*sup* is the left leg 3L (i.e., when the free leg 3*swg* is the right leg 3R), the third landing permissible region is set to a region A3R existing on the right side of the supporting leg side foot 16*sup*, for example, as shown in FIG. 9B.

Figure 9B:
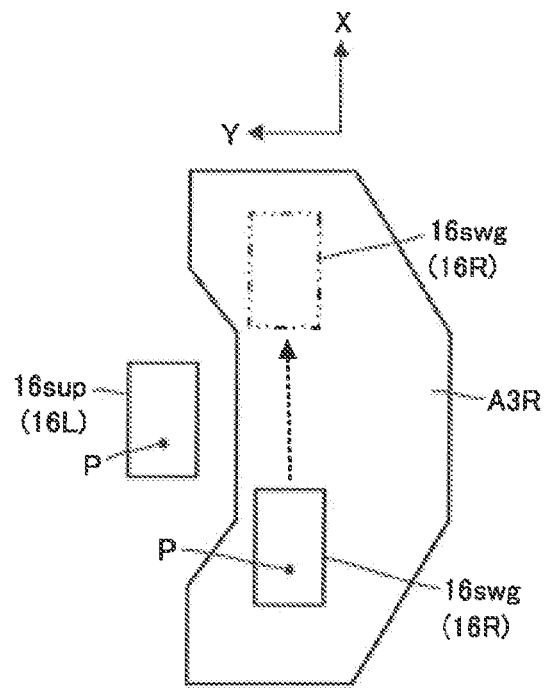
FIG. 9B is a view illustrating a setting example of a third landing permissible region when a supporting leg is a left leg.

Note that it is assumed in FIGS. 9A and 9B that the heights of the landing positions of the free leg side foot 16*swg* are identical. In this case, the third landing permissible region A3L in FIG. 9A and the third landing permissible region A3R in FIG. 9B are symmetrical regions.

The leg motion control unit 36 corresponds to a leg motion control unit in the present invention, including a function as a landing permissible region selecting unit (landing permissible region selecting unit 37). As will be described in detail later, this leg motion control unit 36 determines a target gait of the robot 1 to define the target displacement amount of each of the joints 17 to 22 of each leg 3, respectively, in such a manner to satisfy constraint conditions according to the first landing permissible region or the second landing permissible region, and the third landing permissible region set as mentioned above, and dynamic constraint conditions of the robot 1. In the embodiment, the target gait includes the trajectory of a target position and a target posture of the foot 16 of each leg 3, and the trajectory of a target position and a target posture of the body 2.

In this case, the target positions and target postures of each foot 16 and the body 2 are represented as positions and postures in a global coordinate system (inertial coordinate system) fixed on the floor. In the embodiment, for example, a supporting leg coordinate system in which the origin position is defined according to the grounding position of the supporting leg side foot 16*sup* of the robot 1 is used as the global coordinate system. In this case, the origin position in the supporting leg coordinate system is updated each time the supporting leg 3*sup* of the robot 1 changes from one of the legs 3R and 3L to another.

A coordinate system steadily fixed on the floor may also be used as the global coordinate system. Alternatively, a supporting leg coordinate system in which the origin position is updated, for example, each time the robot 1 moves a few steps (such as two steps or three steps) may be used as the global coordinate system.

Then, the leg motion control unit 36 sequentially determines the target displacement amount (the target rotational angle in the embodiment) of each of the joints 17 to 22 of each leg 3 according to the determined target gait. Further, the leg motion control unit 36 performs feedback control on a joint actuator 30 corresponding to each of the joints 17 to 22 to make the actual displacement amount of each of the joints 17 to 22 to follow the target displacement amount. Thus, the movement of the robot 1 is generated according to the target gait.

Next, more specific operation when the robot 1 is moved over a step ahead of the robot 1 in the traveling direction will be described with reference to a flowchart of FIG. 10.

Figure 10:
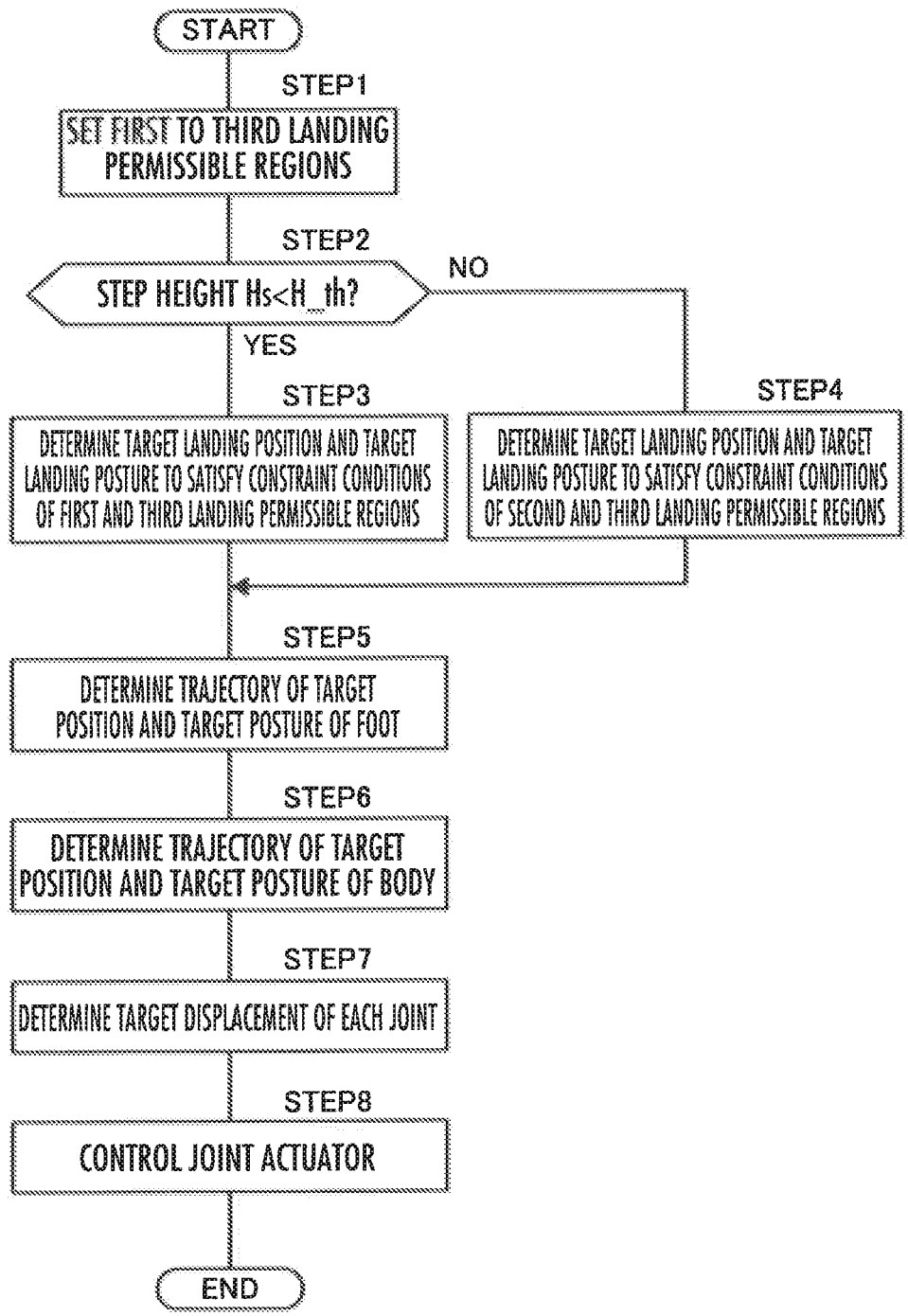
FIG. 10 is a flowchart showing control processing when the legged mobile robot of the embodiment is moved over a step.

Note that processing in the flowchart of FIG. 10 is started from a state in which one or both of the feet 16 of both legs 3R and 3L of the robot 1 are grounded on the floor surface slightly in front of the step.

When the robot 1 is moved over a step such as stairs, the control processing unit 31 performs the processing shown in the flowchart of FIG. 10 each time the supporting leg 3*sup* changes from one of the legs 3R and 3L to another (i.e., each time the robot 1 moves one step).

In STEP1, the control processing unit 31 causes the first landing permissible region setting unit 33, the second landing permissible region setting unit 34, and the third landing permissible region setting unit 35 to perform processing for setting the first landing permissible region, the second landing permissible region, and the third landing permissible region of the free leg side foot 16*swg*, respectively.

The first and second landing permissible regions are set as mentioned above according to the type of step (the type of upward step or downward step) recognized by the floor shape recognizing unit 32, respectively. Further, the third landing permissible region is set as mentioned above according to whether the current supporting leg 3*sup* of the robot 1 is either of the right leg 3R and the left leg 3L.

When the step over which the robot 1 is moved is an upward step, the height (the position in the Z axis direction) of these first to third landing permissible regions is the same as the height of an upper tread surface one step above the tread surface on which the supporting leg side foot 16*sup* is grounded during the movement of the free leg side foot 16*swg*. When the step over which the robot 1 is moved is a downward step, the height (the position in the Z axis direction) of these first to third landing permissible regions is the same as the height of a lower tread surface one step below the tread surface on which the supporting leg side foot 16*sup* is grounded during the movement of the free leg side foot 16*swg*.

Next, the control processing unit 31 causes the leg motion control unit 36 to perform control processing in STEP2 and beyond.

In this case, processing in STEP2 to STEP4 is processing performed by the landing permissible region selecting unit 37. In STEP2, the landing permissible region selecting unit 37 of the leg motion control unit 36 determines whether or not a step height Hs recognized by the floor shape recognizing unit 32 is lower than a predetermined threshold value H_th. Specifically, as shown in FIG. 5 to FIG. 8, the step height Hs is an interval between the tread surface on which the supporting leg side foot 16*sup* is grounded and an upper tread surface one step above or a lower tread surface one step below in the vertical direction (Z-axis direction).

Here, a situation where the determination result in STEP2 is affirmative is a situation where the step height is not very high. Therefore, even when the foot 16*swg* is landed on the upper tread surface or the lower tread surface to be able to ground the entire or substantially the entire bottom surface (grounding surface) of the free leg side foot 16*swg* on the upper tread surface or the lower tread surface, the displacement amount of each of the joints 17 to 22 of each leg 3 can stay within a range not to come too close to the limit of the range of movement, respectively.

On the other hand, a situation where the determination result in STEP2 is negative is a situation where the step height is high. Therefore, when the foot 16*swg* is landed on the upper tread surface or the lower tread surface to be able to ground the entire or substantially the entire bottom surface (grounding surface) of the free leg side foot 16*swg* on the upper tread surface or the lower tread surface, required displacement amount of a joint of either of the legs 3R or 3L reaches or exceeds the limit of the range of movement at the beginning of the landing or immediately before leaving the floor after the landing, making the displacement amount more likely to be excessive.

Specifically, for example, when the step over which the robot 1 is moved is the upward step, if the foot 16*swg* is landed on the upper tread surface or the lower tread surface to be able to ground the entire or substantially the entire bottom surface (grounding surface) of the free leg side foot 16*swg* on the upper tread surface in the situation where the determination result in STEP2 is negative, the displacement amount of the joint 21 of the ankle joint 15, the joint 20 of the knee joint 13, and the like of the free leg 3*swg* at the beginning of the landing or in the vicinity thereof of the free leg side foot 16*swg* will tend to be excessive. Further, the shank 14 or the knee joint 13 of the free leg 3*swg* easily comes into contact with the edge or the like of a tread surface one step above the upper tread surface on which the free leg side foot 16*swg* is landed.

When the step over which the robot 1 is moved is the downward step, the foot 16*swg* is landed on the upper tread surface or the lower tread surface to be able to ground the entire or substantially the entire bottom surface (grounding surface) of the free leg side foot 16*swg* on the upper tread surface in the situation where the determination result in STEP2 is negative, the displacement amount of the joint 21 of the ankle joint 15, the joint 20 of the knee joint 13, and the like of the leg 3 having the supporting leg side foot 16*sup* will tend to be excessive immediately before the foot 16 leaves the floor again (i.e., at the beginning of landing the other foot 16) where the foot 16 is the one which became the supporting leg side foot 16*sup* after the landing of the free leg side foot 16*swg*.

Therefore, when the determination result in STEP2 is affirmative, the landing permissible region selecting unit 37 of the leg motion control unit 36 selects in STEP3 the first landing permissible region and the third landing permissible region as landing permissible regions for movement control. Then, the landing permissible region selecting unit 37 determines a target landing position and a target landing posture of the free leg side foot 16*swg* to satisfy constraint conditions stipulated according to these first landing permissible region and third landing permissible region.

More specifically, the target landing position and the target landing posture of the foot 16*swg* are determined in STEP3 to satisfy such a constraint condition that the target landing position of the free leg side foot 16*swg* exists in both regions of the first landing permissible region and the third landing permissible region.

In this case, the target landing posture is determined to make the bottom surface (grounding surface) of the free leg side foot 16*swg* parallel to (or level with) the upper tread surface or the lower tread surface as the landing portion, and make the front-back direction of the free leg side foot 16*swg* roughly aligned to the depth direction of the upper tread surface or the lower tread surface within a preset range.

Then, the target landing position is set to a position within a region where the first landing permissible region and the third landing permissible region are overlapped. In this case, although the target landing position may be any position within the overlapped region, it is preferred to set the target landing position by reflecting requirements for the motion of the robot 1 such as a target traveling direction and a target stride length of the robot 1.

In the processing of STEP3, when the step over which the robot 1 is moved is the upward step, the target landing position and the target landing posture of the free leg side foot 16*swg* are set, for example, as illustrated by the free leg side foot 16*swg* indicated by a two-dot chain line in FIGS. 5A and 5B. In the example shown, since the free leg side foot 16*swg* is the foot 16L of the left leg 3L, the target landing position is set within a region where the first landing permissible region Au1 on the upper tread surface 52*u* and the third landing permissible region A3L (shown in FIG. 5B) related to the left foot 16L are overlapped.

When the step over which the robot 1 is moved is the downward step, the target landing position and the target landing posture of the free leg side foot 16*swg* are set, for example, as illustrated by the free leg side foot 16*swg* indicated by the two-dot chain line in FIGS. 6A and 6B. In the example shown, since the free leg side foot 16*swg* is the foot 16L of the left leg 3L, the target landing position is set within a region where the first landing permissible region Ad1 on the lower tread surface 52*d* and the third landing permissible region A3L (shown in FIG. 6B) related to the left foot 16L are overlapped.

On the other hand, when the determination result in STEP2 is negative, the landing permissible region selecting unit 37 of the leg motion control unit 36 selects in STEP4 the second landing permissible region and the third landing permissible region as landing permissible regions for movement control of the robot 1. Then, the landing permissible region selecting unit 37 determines a target landing position and a target landing posture of the free leg side foot 16*swg* to satisfy constraint conditions stipulated according to these second landing permissible region and third landing permissible region.

More specifically, the target landing position and the target landing posture of the foot 16*swg* are determined in STEP4 to satisfy such a constraint condition that the target landing position of the free leg side foot 16*swg* exists in both regions of the second landing permissible region and the third landing permissible region.

In this case, the target landing posture is determined in the same manner as in STEP3. Then, the target landing position is set to a position within a region where the second landing permissible region and the third landing permissible region are overlapped. In this case, although the target landing position may be any position within the overlapped region, it is preferred to set the target landing position by reflecting requirements for the motion of the robot 1, such as a target traveling direction and a target stride length of the robot 1, like in STEP3.

In the processing of STEP4, when the step over which the robot 1 is moved is the upward step, the target landing position and the target landing posture of the free leg side foot 16swg are set, for example, as illustrated by the free leg side foot 16swg (specifically, the free leg side foot 16swg in a posture parallel to the upper tread surface 52u) indicated by the two-dot chain line in FIG. 7A and the free leg side foot 16swg indicated by the two-dot chain line in FIG. 7B. In the example shown, since the free leg side foot 16swg is the foot 16L of the left leg 3L, the target landing position is set within a region where the second landing permissible region Au2 having the same height as the upper tread surface 52u and the third landing permissible region A3L (shown in FIG. 7B) related to the left foot 16L are overlapped.

When the step over which the robot 1 is moved is the downward step, the target landing position is set as illustrated by the free leg side foot 16swg (specifically, the free leg side foot 16swg in a posture parallel to the lower tread surface 52d) indicated by the two-dot chain line in FIG. 8A and the free leg side foot 16swg indicated by the two-dot chain line in FIG. 8B. In the example shown, since the free leg side foot 16swg is the foot 16L of the left leg 3L, the target landing position is set within a region where the second landing permissible region Ad2 on the lower tread surface 52d and the third landing permissible region A3L (shown in FIG. 8B) related to the left foot 16L are overlapped.

Next, in STEP5, the leg motion control unit 36 determines a trajectory (or a parameter defining the trajectory) of the target position and target posture of each foot 16. In this case, the trajectory (or the parameter defining the trajectory) of the target position and target posture of each foot 16 is so determined that the motion of each foot 16 will be achieved in the following manner, for example.

Referring first to FIG. 5A, a description will be made of the trajectory of the target position and target posture of the free leg side foot 16swg in the situation where the determination result in STEP2 is affirmative (i.e., the situation where the first and third landing permissible regions are selected as the landing permissible regions for movement control of the robot 1) when the step over which the robot 1 is moved is the upward step.

In this trajectory, the foot 16swg is moved up to leave the floor from a state where the bottom surface (grounding surface) of the free leg side foot 16swg is grounded on a tread surface two steps below (or one step below) the upper tread surface 52u. Further, after the foot 16swg is moved in the air toward above the upper tread surface 52u, the foot 16swg is landed on the upper tread surface 52u to ground on the upper tread surface 52u in the target landing position and the target landing posture.

In this case, a target posture during a period around the time when the free leg side foot 16swg leaves the floor may be, for example, a posture in which the bottom surface (grounding surface) of the foot 16swg becomes approximately parallel to the tread surface on which the foot 16swg was grounded immediately before the foot 16swg leaves the floor. A target posture at the beginning of the landing of the free leg side foot 16swg may be, for example, a posture in which the bottom surface (grounding surface) of the foot 16swg becomes approximately parallel to the upper tread surface 52u. Further, a target posture of the free leg side foot 16swg in the air may be any posture such as a horizontal posture.

Note that the foot 16swg may start leaving the floor from the heel side, for example, by rotating the foot 16swg in the pitch direction (the direction about the Y axis) in the period around the time when the free leg side foot 16swg leaves the floor.

Further, the entire or substantially the entire bottom surface (grounding surface) of the foot 16swg may be grounded on the upper tread surface 52u by rotating the foot 16swg in the pitch direction (the direction about Y axis) in a manner not to slide on the upper tread surface 52u after a portion of the foot 16swg near the heel is landed on the upper tread surface 52u at the beginning of the landing of the free leg side foot 16swg.

In a trajectory of the target position and target posture of the supporting leg side foot 16sup, a target position and a target posture of the foot 16sup are maintained steadily in a position and a posture in a state, for example, where the foot 16sup is grounded on the tread surface in a posture of the bottom surface (grounding surface) of the foot 16sup being parallel to a tread surface one step below the upper tread surface 52u during a period from the time when the free leg side foot 16swg leaves the floor until the time of landing.

Note that the grounded portion of the bottom surface of the foot 16sup may be shifted to the tiptoe side, for example, by the rotation in the pitch direction (the direction about Y axis) of the supporting leg side foot 16sup in the period around the beginning of the landing of the free leg side foot 16swg.

Referring next to FIG. 6A, a description will be made of the trajectory of the target position and target posture of the free leg side foot 16swg in the situation where the determination result in STEP2 is affirmative (i.e., the situation where the first and third landing permissible regions are selected as the landing permissible regions for movement control of the robot 1) when the step over which the robot 1 is moved is the downward step.

In this trajectory, the foot 16swg is moved up to leave the floor from a state where the bottom surface (grounding surface) of the free leg side foot 16swg is grounded on a tread surface two steps above (or one step above) the lower tread surface 52d. Further, after the foot 16swg is moved in the air toward above the lower tread surface 52d, the foot 16swg is landed on the lower tread surface 52d to ground on the lower tread surface 52d in the target landing position and the target landing posture.

In this case, a target posture during a period around the time when the free leg side foot 16swg leaves the floor, a target posture at the beginning of the landing of the free leg side foot 16swg, and a target posture of the free leg side foot 16swg in the air may be the same as those when the step is the upward step.

In other words, the target posture during the period around the time when the free leg side foot 16swg leaves the floor may be, for example, a posture in which the bottom surface (grounding surface) of the foot 16swg becomes approximately parallel to the tread surface on which the foot 16swg was grounded immediately before the foot 16swg leaves the floor. The target posture at the beginning of the landing of the free leg side foot 16swg may be, for example, a posture in which the bottom surface (grounding surface) of the foot 16swg becomes approximately parallel to the lower tread surface 52d. Further, the target posture of the free leg side foot 16swg in the air may be any posture such as a horizontal posture or the like.

Alternatively, the foot 16*swg* may start leaving the floor from the heel side, for example, by rotating the foot 16*swg* in the pitch direction (the direction about Y axis) in the period around the time when the free leg side foot 16*swg* leaves the floor.

Further, the entire or substantially the entire bottom surface (grounding surface) of the foot 16*swg* may be grounded on the lower tread surface 52*d* by rotating the foot 16*swg* in the pitch direction (the direction about Y axis) in a manner not to slide on the lower tread surface 52*d* after a portion of the foot 16*swg* near the heel is landed on the upper tread surface 52*u* at the beginning of the landing of the free leg side foot 16*swg*.

In a trajectory of the target position and target posture of the supporting leg side foot 16*sup*, a target position and a target posture of the foot 16*sup* are maintained steadily in a position and a posture in a state, for example, where the foot 16*sup* is grounded on the tread surface in a posture of the bottom surface (grounding surface) of the foot 16*sup* being parallel to a tread surface one step above the lower tread surface 52*d* during a period from the time when the free leg side foot 16*swg* leaves the floor until the time of landing.

Note that the grounded portion of the bottom surface of the foot 16*sup* may be shifted to the tiptoe side, for example, by rotation in the pitch direction (the direction about Y axis) of the supporting leg side foot 16*sup* in the period around the beginning of the landing of the free leg side foot 16*swg*.

Referring next to FIG. 7A, a description will be made of the trajectory of the target position and target posture of the free leg side foot 16*swg* in the situation where the determination result in STEP2 is negative (i.e., the situation where the second and third landing permissible regions are selected as the landing permissible regions for movement control of the robot 1) when the step over which the robot 1 is moved is the upward step.

In this trajectory, the foot 16*swg* is moved up to leave the floor from a state where a portion of the bottom surface (grounding surface) of the free leg side foot 16*swg* near the tiptoe is grounded on a tread surface two steps below (or one step below) the upper tread surface 52*u*. Further, after the foot 16*swg* is moved in the air toward above the edge 52*e* of the upper tread surface 52*u*, the foot 16*swg* is landed on the edge 52*e* of the upper tread surface 52*u* in a position defined by the target landing position in a posture of the foot 16*swg* being inclined relative to the upper tread surface 52*u* at a predetermined angle of inclination in the pitch direction (the direction about Y axis) (hereinafter called the first angle of inclination) (see the posture of the foot 16*swg* being inclined in FIG. 7A).

In this case, the above first angle of inclination (the angle of inclination in the pitch direction) of the free leg side foot 16*swg* is so determined that, when the free leg side foot 16*swg* is landed on the edge 52*e* of the upper tread surface 52*u* while grounding the supporting leg side foot 16*sup* on a tread surface one step below the upper tread surface 52*u*, the displacement amount of each of the joints 17 to 22 of the free leg 3*swg* will fall within the predetermined range for each joint (the range in which the displacement amount of each of the joints 17 to 22 does not come too close to the limit of the range of movement), and a floor reaction force acting against the gravity acting on the robot 1 can be made to act on the free leg side foot 16*swg* grounded on the edge 52*e*.

The first angle of inclination of the free leg side foot 16*swg* mentioned above is determined, for example, according to the step height Hs based on a predefined arithmetic expression or map or the like.

In the trajectory of the target position and target posture of the free leg side foot 16*swg* in this case, the foot 16*swg* is grounded on the upper tread surface 52*u* in the target landing position and the target landing posture by rotating the foot 16*swg* in the pitch direction (the direction about Y axis) about the edge 52*e* as a tilting center after the foot 16*swg* is landed on the edge 52*e* as mentioned above. At this time, a portion closer to the tiptoe side than the edge 52*e* on the bottom surface (grounding surface) of the foot 16*swg* is grounded on the upper tread surface 52*u*.

Further, when the foot 16*swg* leaves the floor of the upper tread surface 52*u* next time, the foot 16*swg* is grounded in a portion near the tiptoe by rotating the foot 16*swg* in the pitch direction (the direction about Y axis). This state is a state of the foot 16*swg* on the tread surface two steps below the upper tread surface 52*u* in FIG. 7A.

In a trajectory of the target position and target posture of the supporting leg side foot 16*sup*, a target position and a target posture of the foot 16*sup* are maintained steadily in a state, for example, where the foot 16*sup* is grounded on the tread surface in a posture of the bottom surface (grounding surface) of the foot 16*sup* being parallel to a tread surface one step below the upper tread surface 52*u* during a period from the time when the free leg side foot 16*swg* leaves the floor until the time of landing.

Then, the grounded portion of the bottom surface of the foot 16*sup* is shifted to the tiptoe side by rotation in the pitch direction (the direction about Y axis) of the supporting leg side foot 16*sup* after the landing of the free leg side foot 16*swg*.

Note that the grounded portion of the bottom surface of the foot 16*sup* may be shifted to the tiptoe side, for example, by rotating the supporting leg side foot 16*sup* in the pitch direction (the direction about Y axis) from immediately before the landing of the free leg side foot 16*swg*.

Referring next to FIG. 8A, a description will be made of the trajectory of the target position and target posture of the free leg side foot 16*swg* in the situation where the determination result in STEP2 is negative (i.e., the situation where the second and third landing permissible regions are selected as the landing permissible regions for movement control of the robot 1) when the step over which the robot 1 is moved is the downward step.

In this trajectory, the foot 16*swg* is moved up to leave the floor from a state where the bottom surface (grounding surface) of the free leg side foot 16*swg* is grounded on the edge of a tread surface two steps above (or one step above) the lower tread surface 52*d*. Further, after the foot 16*swg* is moved in the air toward above the edge 52*e* of the lower tread surface 52*d*, the foot 16*swg* is landed on the lower tread surface 52*d* to ground on the lower tread surface 52*d* in a target landing position and a target landing posture.

In this case, a target posture of the free leg side foot 16*swg* in the air may be any posture such as a horizontal posture.

In a trajectory of the target position and target posture of the supporting leg side foot 16*sup*, a target position and a target posture of the foot 16*sup* are maintained steadily in a position and a posture in a state, for example, where the foot 16*sup* is grounded on the tread surface in a posture of the bottom surface (grounding surface) of the foot 16*sup* being parallel to a tread surface one step above the lower tread surface 52*d* during a period from the time when the free leg side foot 16*swg* leaves the floor to the time immediately before the landing.

Here, since the situation shown in FIG. 8 is the situation where the determination result in STEP2 is negative, a portion of the above supporting leg side foot 16*sup* near the tiptoe side protrudes from the edge of the tread surface one step above the lower tread surface 52d upon acting as the free leg side foot 16swg before becoming the supporting leg side foot 16sup. Therefore, the supporting leg side foot 16sup is rotated in the pitch direction (the direction about Y axis) to enable the supporting leg side foot 16sup to ground on the edge of the tread surface one step above the lower tread surface 52d.

Therefore, in the trajectory of the target position and target posture of the supporting leg side foot 16sup, the foot 16sup is rotated in the pitch direction (the direction about Y axis) about the edge of the tread surface being grounded thereon as the tilting center from immediately before the landing of the free leg side foot 16swg to incline the foot 16sup relative to the tread surface being grounded thereon at a predetermined angle of inclination (hereinafter called the second angle of inclination).

In this case, the above second angle of inclination (the angle of inclination in the pitch direction) of the supporting leg side foot 16sup is so determined that, when the free leg side foot 16swg is landed on the edge 52e of the lower tread surface 52d while grounding the supporting leg side foot 16sup on an edge (the edge of a tread surface one step above the lower tread surface 52d) in a posture of being inclined at the second angle of inclination, the displacement amount of each of the joints 17 to 22 of the supporting leg 3sup will fall within the predetermined range for each joint (the range in which the displacement amount of each of the joints 17 to 22 does not come too close to the limit of the range of movement), and a floor reaction force acting against the gravity acting on the robot 1 can be made to act from the edge on which the supporting leg side foot 16sup is being grounded.

The second angle of inclination of the supporting leg side foot 16sup mentioned above is determined according to the step height Hs based, for example, on a predefined arithmetic expression or map or the like.

The supporting leg side foot 16sup inclined in the pitch direction as mentioned above leaves the edge as the free leg side foot 16swg next time. This state is a state of the foot 16swg grounded on the edge of a tread surface two steps above the lower tread surface 52d in FIG. 8A.

In STEP5 of FIG. 10, a trajectory (or a parameter defining the trajectory) of the target position and target posture of each foot 16 is determined as mentioned above.

Next, in STEP6, the leg motion control unit 36 determines the trajectory of a target position and a target posture of the body 2 using a kinetic model of the robot 1.

In this case, the leg motion control unit 36 determines the trajectory of a target ZMP as the target position of a ZMP (Zero Moment Point) to make the target ZMP present in a support polygon defined by the trajectory of the target position and target posture of each foot 16.

Then, a trajectory of the target position and target posture of the body 2 is determined to make the position of the ZMP calculated by the kinetic model correspond to the target ZMP.

In this case, target positions and target trajectories of each foot 16 and the body 2 may be tentatively calculated for two or more steps of the robot 1, respectively, to ensure the stability of the posture during the movement of the robot 1, and after the target landing position and the like of the free leg side foot 16swg are corrected accordingly, the trajectories of the target positions and target postures of each foot 16 and the body 2 may be recalculated, respectively.

Next, from the trajectories of the target positions and target postures of each foot 16 and the body 2 determined as mentioned above, the leg motion control unit 36 determines in STEP7 a target displacement amount (a target value of the rotational angle) of each of the joints 17 to 22 of each leg 3 defined thereby for each cycle of the control processing using a geometric model (link model) of the robot 1.

Then, in STEP8, the leg motion control unit 36 controls a joint actuator 30 for each joint to make the actual displacement amount of each of the joints 17 to 22 of each leg 3 follow the target displacement amount.

As a result, each foot 16 and the body 2 move according to the respective trajectories of the target positions and target postures. Thus, the robot 1 moves over (goes up and down) a step.

According to the embodiment described above, when the robot 1 is moved over a step such as stairs, if the step height is high (higher than the threshold value H_th), the second landing permissible region and the third landing permissible region are used as the landing permissible regions for movement control of the robot 1. Therefore, in the case of an upward step, the free leg side foot 16swg can be landed on the edge of the upper tread surface in a posture inclined relative to the upper tread surface in the pitch direction.

In the case of a downward step, the free leg side foot 16swg (specifically, a foot 16 changed from the free leg side foot 16swg to the supporting leg side foot 16sup) can be grounded on the edge of the tread surface in a posture inclined relative to the tread surface in the pitch direction immediately before the free leg side foot 16swg leaves the floor after being landed on the lower tread surface.

This can prevent the displacement amount of each of the joints 17 to 22 of each leg 3 from becoming excessive during the movement of the robot 1 in the upward step or the downward step having a relatively high step height.

Therefore, even when the step height is relatively high, the movement of the robot 1 in the upward step or the downward step can be achieved smoothly without any hindrance.

When the step height is low (lower than the threshold value H th), the first landing permissible region and the third landing permissible region are used as the landing permissible regions for movement control of the robot 1. This enables the robot 1 to move over a step without the occurrence of interference between each foot 16 and the tread surface of the step. Then, since the step height is relatively low in this case, the displacement amount of any of the joints of each leg 3 can be prevented from becoming excessive even if the free leg side foot 16swg is landed in the first landing permissible region.

Thus, according to the embodiment, the movement of the robot 1 in the step can be achieved smoothly without any hindrance regardless of whether the step height is high or low.

Further, the landing permissible regions for movement control are classified and set into the first to third landing permissible regions, and this can prevent processing for setting each individual landing permissible region from being complicated. Thus, the processing for setting the first to third landing permissible regions can easily be performed.

While the embodiment has been described above by taking as an example a bipedal walking robot as the legged mobile robot, the legged mobile robot of the present invention may also be a robot having three or more legs.

What is claimed is:

1. A control device for a legged mobile robot, which causes the legged mobile robot to move on a floor having a step, comprising:

a first landing permissible area setting unit configured to set a first landing permissible area indicating a region of a landing position of a foot of a free leg, which is permitted to ground the foot of the free leg of the legged mobile robot within an upper tread surface or a lower tread surface of the step in a situation where the step exists ahead of the legged mobile robot in a traveling direction;

a second landing permissible area setting unit configured to set a second landing permissible area indicating a region of the landing position of the foot of the free leg of the legged mobile robot, which is permitted to ground the foot of the free leg of the legged mobile robot on an edge of a tread surface in a posture inclined relative to the upper tread surface or the lower tread surface of the step in the situation;

a landing permissible area selecting unit configured to select either one of the landing permissible areas as a landing permissible area for movement control of the legged mobile robot from the first landing permissible area and the second landing permissible area in the situation while switching the selected landing permissible area to the other according to a height of the step; and a leg motion control unit configured to control motion of each leg of the legged mobile robot in the step based on a constraint condition that the landing position of the foot of the free leg is made present in the landing permissible area selected by the landing permissible area selecting unit, wherein the leg motion control unit is configured to ground the foot of the free leg of the legged mobile robot in the first landing permissible area within the upper tread surface or the lower tread surface of the step when the first landing permissible area is selected by the landing permissible area selecting unit as the landing permissible area for movement control of the legged mobile robot, and configured to ground the foot of the free leg of the legged mobile robot on the edge of the tread surface in the posture inclined relative to the upper tread surface or the lower tread surface of the step when the second landing permissible area is selected by the landing permissible area selecting unit as the landing permissible area for movement control of the legged mobile robot.

2. The control device for the legged mobile robot according to claim 1, wherein when the second landing permissible area is selected by the landing permissible area selecting unit in a situation where the step existing ahead of the legged mobile robot in the traveling direction is an upward step, the leg motion control unit is configured to land the foot of the free leg on the edge of the upper tread surface in a posture inclined relative to the upper tread surface of the step while satisfying the constraint condition, and then, configured to control the motion of each leg in such a manner that, after the foot is rotated in a pitch direction to ground on the upper tread surface, the foot is made to perform a next floor leaving from the upper tread surface.

3. The control device for the legged mobile robot according to claim 1, wherein when the second landing permissible area is selected by the landing permissible area selecting unit in a situation where the step existing ahead of the legged mobile robot in the traveling direction is a downward step, the leg motion control unit is configured to land the foot of the free leg on the lower tread surface while satisfying the constraint condition, and then, configured to control the motion of each leg in such a manner that, after the foot is rotated in a pitch direction to ground on an edge of the lower tread surface in a posture of the foot being inclined relative to the lower tread surface, the foot is made to perform a next floor leaving from the edge.

4. The control device for the legged mobile robot according to claim 1, further comprising a third landing permissible area setting unit configured to set a third landing permissible area defined depending on a structure of the legged mobile robot as a region in which the foot of the free leg can be landed without occurrence of interference between the free leg and another leg while limiting the motion of each leg of the legged mobile robot within a range of movement of each leg in the situation, wherein the leg motion control unit is configured to control the motion of each leg of the legged mobile robot in the step based on a further constraint condition that the landing position of the foot of the free leg is made present in the third landing permissible area.

5. The control device for the legged mobile robot according to claim 4, wherein the first landing permissible area setting unit is configured to set the first landing permissible area to be dependent on a shape and size of the upper tread surface or the lower tread surface on which the foot of the free leg is to be grounded, and the second landing permissible area setting unit is configured to set the second landing permissible area to be dependent on a shape and size of an edge of the upper tread surface or the lower tread surface on which the foot of the free leg is to be grounded, and to be able to limit displacement amount of each joint within a predetermined range when the foot is grounded on the edge.

6. The control device for the legged mobile robot according to claim 1, wherein, when the step is an upward step, the second landing permissible area is set to include an area out of the tread surface.

* * * * *